(12) United States Patent
Chen et al.

(10) Patent No.: US 11,920,923 B2
(45) Date of Patent: Mar. 5, 2024

(54) WATER HEATER, AND SCALE DETECTION SYSTEM AND METHOD

(71) Applicant: A. O. SMITH (CHINA) WATER HEATER CO., LTD., Nanjing (CN)

(72) Inventors: Tao Chen, Nanjing (CN); Hongfei Ma, Nanjing (CN); Shufeng Liu, Nanjing (CN)

(73) Assignee: A. O. Smith Corporation, Milwaukee, WI (US)

( * ) Notice: Subject to any disclaimer, the term of this patent is extended or adjusted under 35 U.S.C. 154(b) by 160 days.

(21) Appl. No.: 17/470,474

(22) Filed: Sep. 9, 2021

(65) Prior Publication Data

US 2022/0187065 A1 Jun. 16, 2022

(30) Foreign Application Priority Data

Dec. 15, 2020 (CN) .......................... 202011476069.3

(51) Int. Cl.
*G01B 21/08* (2006.01)
*F24H 1/20* (2022.01)
(Continued)

(52) U.S. Cl.
CPC ............ *G01B 21/085* (2013.01); *F24H 1/20* (2013.01); *F24H 1/205* (2013.01); *F24H 1/206* (2013.01);
(Continued)

(58) Field of Classification Search
CPC ....... G01B 21/085; F24H 1/20; F24H 9/2007; F24H 1/205; F24H 1/206; F24H 1/208;
(Continued)

(56) References Cited

U.S. PATENT DOCUMENTS 4,059,959 A * 11/1977 Matthews ................. F03G 7/04
261/DIG. 11
4,599,975 A * 7/1986 Reeve ..................... F23N 5/003
165/95
(Continued)

FOREIGN PATENT DOCUMENTS

CN 102918332 A 2/2013
CN 108507521 A 9/2018
(Continued)

OTHER PUBLICATIONS

Veronica, Daniel Alexander, "Detecting heat exchanger fouling automatically with an embedded data-driven agent using expert signature maps," ProQuest Information and Learning Company, Copyright 2008, 246 pages.

*Primary Examiner* — Nathaniel T Woodward
*Assistant Examiner* — Philip L Cotey
(74) *Attorney, Agent, or Firm* — Michael Best & Friedrich LLP

(57) ABSTRACT

The present disclosure discloses a water heater, and a scale detection system and method. The scale detection system comprises: a first temperature detector configured to acquire a first temperature of a heat exchange zone of a water heating device; a second temperature detector configured to acquire a second temperature indicating a water temperature in the water heating device; and a controller in communication with the first temperature detector and the second temperature detector, and configured to acquire a temperature difference between the first temperature and the second temperature based on the first temperature acquired by the first temperature detector and the second temperature acquired by the second temperature detector, and determine that a scale generation amount in the water heating device reaches a preset threshold when at least one of the following judgment conditions is met: the first temperature is not less (Continued)

than a preset temperature threshold; and the temperature difference is not less than a preset temperature difference threshold. The present disclosure can ensure that a user can be reliably and timely reminded to clean the scale under different working conditions.

18 Claims, 11 Drawing Sheets

(51) Int. Cl.
    *F24H 9/20*     (2022.01)
    *G01K 1/02*     (2021.01)
    *G01K 3/00*     (2006.01)
    *G01K 3/08*     (2006.01)
    *G01K 3/14*     (2006.01)
    *G01K 13/00*     (2021.01)
    *G01K 13/02*     (2021.01)

(52) U.S. Cl.
    CPC ......... *F24H 1/208* (2013.01); *F24H 9/2007* (2013.01); *G01K 1/026* (2013.01); *G01K 3/005* (2013.01); *G01K 3/08* (2013.01); *G01K 3/14* (2013.01); *G01K 13/00* (2013.01); *G01K 13/02* (2013.01)

(58) Field of Classification Search
    CPC .......... G01K 1/026; G01K 3/005; G01K 3/08; G01K 3/14; G01K 13/00; G01K 13/02
    See application file for complete search history.

(56) References Cited

U.S. PATENT DOCUMENTS

| | | | | |
|---|---|---|---|---|
| 5,590,706 | A * | 1/1997 | Tsou | F28F 19/00 165/95 |
| 5,992,505 | A * | 11/1999 | Moon | G01K 3/08 374/E3.006 |
| 6,485,174 | B1 * | 11/2002 | Albrecht | G01K 17/08 374/E17.008 |
| 9,625,165 | B2 * | 4/2017 | Minamisako | F24H 4/04 |
| 10,295,489 | B2 * | 5/2019 | Chattoraj | G01K 7/18 |
| 2004/0086020 | A1 * | 5/2004 | Jordahl | G01K 3/005 374/45 |
| 2005/0109032 | A1 * | 5/2005 | Harpster | F28B 1/02 60/685 |
| 2005/0217841 | A1 * | 10/2005 | Van Den Ende | G01K 17/20 374/E1.019 |
| 2009/0020282 | A1 * | 1/2009 | Benonysson | F24D 19/1069 165/294 |
| 2009/0188645 | A1 * | 7/2009 | Harpster | F28F 19/00 165/11.1 |
| 2011/0048340 | A1 * | 3/2011 | Anderson | F24H 15/33 122/14.22 |
| 2012/0067542 | A1 * | 3/2012 | Frach | F22B 37/38 73/204.11 |
| 2014/0202679 | A1 * | 7/2014 | Kusachi | F24H 15/36 165/287 |
| 2014/0222218 | A1 * | 8/2014 | D'silva | F24D 19/1048 700/276 |
| 2014/0369672 | A1 * | 12/2014 | Hussain | A47J 31/545 392/480 |
| 2015/0144074 | A1 * | 5/2015 | Fujimoto | F24H 15/288 122/18.4 |
| 2015/0226453 | A1 * | 8/2015 | Nomoto | F25B 6/04 62/238.7 |
| 2016/0003486 | A1 * | 1/2016 | Minamisako | F24D 19/1051 122/15.1 |
| 2016/0033171 | A1 * | 2/2016 | Mase | F24H 15/35 122/18.4 |
| 2016/0178221 | A1 * | 6/2016 | Thornton | F24H 15/223 700/295 |
| 2017/0108211 | A1 * | 4/2017 | Satoh | F24H 15/31 |
| 2017/0108242 | A1 * | 4/2017 | Hamagami | F24H 1/145 |
| 2018/0128514 | A1 * | 5/2018 | Knoeppel | C23F 13/005 |
| 2019/0162444 | A1 * | 5/2019 | Choi | F24H 1/205 |
| 2019/0285315 | A1 * | 9/2019 | Chaudhry | F24H 15/281 |
| 2020/0025413 | A1 * | 1/2020 | Lopez | F16K 15/033 |
| 2020/0292478 | A1 * | 9/2020 | Chattoraj | G01N 25/4873 |
| 2021/0108917 | A1 * | 4/2021 | Hazuku | G01B 21/085 |
| 2022/0082288 | A1 * | 3/2022 | Revilla | F24H 1/145 |
| 2022/0196253 | A1 * | 6/2022 | Iwai | F24D 19/0092 |

FOREIGN PATENT DOCUMENTS

| | | |
|---|---|---|
| CN | 111059768 A | 4/2020 |
| JP | 2011252677 A | 12/2011 |
| JP | 6510755 B2 | 5/2019 |

* cited by examiner

WATER HEATER, AND SCALE DETECTION SYSTEM AND METHOD

TECHNICAL FIELD

The present disclosure relates to a technical field of heat exchange systems, and particularly to a water heater, and a scale detection system and method.

BACKGROUND ART

The water heating device is a device for generating hot water. The existing water heating devices includes: a water heater, a boiler, etc.

Since water contains calcium and magnesium ions, the heated calcium and magnesium ions are precipitated into the scale and adhered to an inner wall of the water heating device. The scale is gradually thickened during a working process of the water heating device. When the thickness reaches a certain degree, the scale needs to be removed in time. Otherwise, it will not only affect the heat transfer effect and waste the energy, but also cause an excessively high local temperature and then lead to a water leakage.

In order to solve negative influences of the scale accumulated in the water heating device during a use thereof on the working performance and the reliability, it is necessary to measure the thickness of the scale, so as to remind a user to clean the scale in time.

In order to detect the thickness of the scale, a scale detection device may be added. However, when the current scale detection device is used, the detection accuracy cannot meet the use requirement, and especially cannot be accurately adapted to different working conditions.

SUMMARY OF THE DISCLOSURE

In order to overcome the defects of the prior art, the technical problem to be solved by the embodiments of the present disclosure is to provide a water heater, and a scale detection system and method, which ensure that a user can be reliably and timely reminded to clean the scale under different working conditions.

The specific technical solutions of the embodiments of the present disclosure are as follows:

According to a first aspect, a scale detection method is provided, comprising:

acquiring a first temperature of a heat exchange zone of a water heating device;

acquiring a second temperature indicating a water temperature in the water heating device, and acquiring a temperature difference between the first temperature and the second temperature; and determining that a scale generation amount in the water heating device reaches a preset threshold when at least one of following judgment conditions is met:

the first temperature is not less than a preset temperature threshold; and the temperature difference is not less than a preset temperature difference threshold.

Further, the scale detection method further comprises: preferentially triggering the judgment condition that the first temperature is not less than the preset temperature threshold, when a flow rate in the water heating device is less than a first preset flow rate or greater than a second preset flow rate.

Further, the scale detection method further comprises: preferentially triggering the judgment condition that the temperature difference is not less than the preset temperature difference threshold, when a flow rate in the water heating device is greater than a first preset flow rate and less than a second preset flow rate.

Further, the scale detection method further comprises: acquiring a flow rate in the water heating device; the judgment condition is that the first temperature is not less than the preset temperature threshold, when the flow rate in the water heating device is less than a first preset flow rate or greater than a second preset flow rate; and the judgment condition is that the temperature difference is not less than the preset temperature difference threshold, when the flow rate in the water heating device is greater than the first preset flow rate and less than the second preset flow rate.

Further, the scale detection method executes the judgment conditions that the first temperature is not less than the preset temperature threshold and the temperature difference is not less than the preset temperature difference threshold at a same time node synchronously or at different time nodes alternately.

Further, the heat exchange zone comprises a high-temperature heat exchange zone and a low-temperature heat exchange zone opposite to each other, and a temperature of the high-temperature heat exchange zone is acquired as the first temperature.

Further, the water heating device comprises a water tank, and the second temperature is a water temperature in the water tank of the water heating device.

Further, the preset temperature threshold is between 60° C. and 110° C.

Further, the preset temperature difference threshold is between 8° C. and 30° C.

According to a second aspect, a scale detection system is provided, comprising:

a first temperature detector configured to acquire a first temperature of a heat exchange zone of a water heating device;

a second temperature detector configured to acquire a second temperature indicating a water temperature in the water heating device; and a controller in communication with the first temperature detector and the second temperature detector, and configured to acquire a temperature difference between the first temperature and the second temperature based on the first temperature acquired by the first temperature detector and the second temperature acquired by the second temperature detector, and determine that a scale generation amount in the water heating device reaches a preset threshold when at least one of following judgment conditions is met: the first temperature is not less than a preset temperature threshold; and the temperature difference is not less than a preset temperature difference threshold.

According to a third aspect, a water heater is provided, comprising the scale detection system aforementioned.

Further, the water heater comprises: a heat exchange mechanism provided with at least one heat exchange runner allowing heat exchange fluid to flow through; and a water tank, wherein the heat exchange fluid can exchange heat with water in the water tank when flowing through the heat exchange runner, so that the heat exchange mechanism forms a high-temperature heat exchange zone and a low-temperature heat exchange zone opposite to each other, and the heat exchange fluid flows through the high-temperature heat exchange zone and the low-temperature heat exchange zone in turn.

Further, the first temperature detector is disposed on a water tank wall of a water tank area corresponding to the high-temperature heat exchange zone.

Further, the first temperature detector is disposed on a water tank wall within a first height range from the heat exchange mechanism, and a predetermined height interval is formed between the second temperature detector and the first temperature detector in a height direction of the water tank.

Further, the second temperature detector is disposed downstream of the first temperature detector in a flow direction of the heat exchange fluid.

Further, the first height range is from 5 cm to 60 cm.

Further, the water tank is provided with a water inlet and a water outlet, and the second temperature detector is disposed at a preset interval from the water inlet of the water tank.

Further, the second temperature detector is disposed at the water inlet.

Further, the water tank has a top wall and a bottom wall opposite to each other and sidewalls enclosed between the top wall and the bottom wall, the heat exchange runner is disposed in the water tank to penetrate therethrough, and the high-temperature heat exchange zone is an area where the heat exchange runner first contacts the water tank.

Further, the high-temperature heat exchange zone is an area where the heat exchange runner contacts the bottom wall of the water tank, when the heat exchange runner penetrates the water tank from the bottom wall to the top wall and the heat exchange fluid flows from the bottom wall to the top wall; or, the high-temperature heat exchange zone is an area where the heat exchange runner contacts the top wall of the water tank, when the heat exchange fluid flows from the top wall to the bottom wall; or, the high-temperature heat exchange zone is an area where the heat exchange runner contacts the sidewall of the water tank, when the heat exchange runner first contacts the sidewall of the water tank.

Further, the heat exchange runner is a heat exchange flue pipe which penetrates the water tank, and an outer side of a pipe wall of the heat exchange flue pipe is fixed with the top wall and the bottom wall or fixed with the sidewall.

The technical solutions of the present disclosure have the following obvious advantageous effects:

The water heater, and the scale detection system and method provided by the present disclosure flexibly adapt the judgment conditions for different working conditions, and accurately judge whether a scale generation amount in the water heating device (water heater) has reached a preset threshold. That is, the scale detection method provided in this specification can automatically adapt different judgment conditions for different working conditions, thus ensuring that that the user can be reliably and timely reminded to clean the scale under different working conditions.

With reference to the following descriptions and drawings, the particular embodiments of the present disclosure will be disclosed in detail to indicate the ways in which the principle of the present disclosure can be adopted. It should be understood that the scope of the embodiments of the present disclosure are not limited thereto. The embodiments of the present disclosure include many changes, modifications and equivalents within the spirit and clauses of the appended claims. The features described and/or illustrated with respect to one embodiment may be used in one or more other embodiments in the same or similar way, may be combined with the features in other embodiments, or may take place of those features.

BRIEF DESCRIPTION OF THE DRAWINGS

The drawings described here are for explanatory purposes only and are not intended to limit the scope of the present disclosure in any way. In addition, the shapes and proportional sizes of the components in the drawings are just schematic to help the understanding of the present disclosure, rather than specifically limiting the shapes and proportional sizes of the components of the present disclosure. Under the teaching of the present disclosure, persons skilled in the art can select various possible shapes and proportional sizes according to specific conditions to carry out the present disclosure.

Reference signs in the above drawings:
1: first temperature detector;
2: second temperature detector;
3: water tank;
  31: water outlet;
  32: water inlet;
  33: top wall;
  34: bottom wall;
  35: sidewall;
40: heat exchange runner;
41: high-temperature heat exchange zone;
42: low-temperature heat exchange zone;
5: burner;
6: flow rate detector;
T1: first temperature;
T2: second temperature;
ΔT: temperature difference.

DETAILED DESCRIPTION OF THE PREFERRED EMBODIMENTS

The technical solutions of the present disclosure will be described in detail as follows with reference to the drawings and the specific embodiments. It should be understood that these embodiments are only used to illustrate the present disclosure rather than limiting the scope thereof. After reading the present disclosure, any equivalent modification made by persons skilled in the art to the present disclosure falls within the scope defined by the appended claims of the present disclosure.

It should be noted that when an element is referred to as being 'disposed' on another element, it may be directly on another element or there may be an intermediate element. When an element is considered to be 'connected' to another element, it may be directly connected to another element or there may be an intermediate element. As used herein, the terms 'vertical', 'horizontal', 'upper', 'lower', 'left', 'right' and similar expressions are only for the purpose of illustration, rather than indicating unique embodiments.

Unless otherwise defined, all technical and scientific terms used herein have the same meanings as those generally understood by persons skilled in the technical field of the present disclosure. The terms used herein in the specification of the present disclosure are only for the purpose of describing the specific embodiments and are not intended to limit the present disclosure. As used herein, the term 'and/or' includes any and all combinations of one or more associated listed items.

Figure 1:
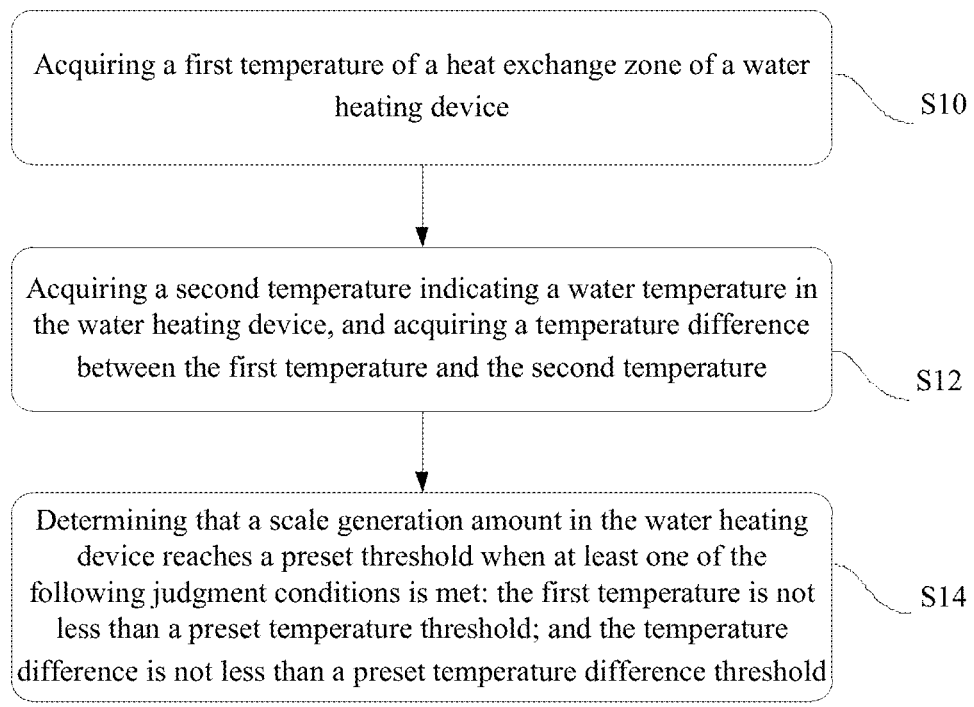
FIG. 1 is a step flowchart of a scale detection method provided in an embodiment of the present disclosure.
Figure 8:
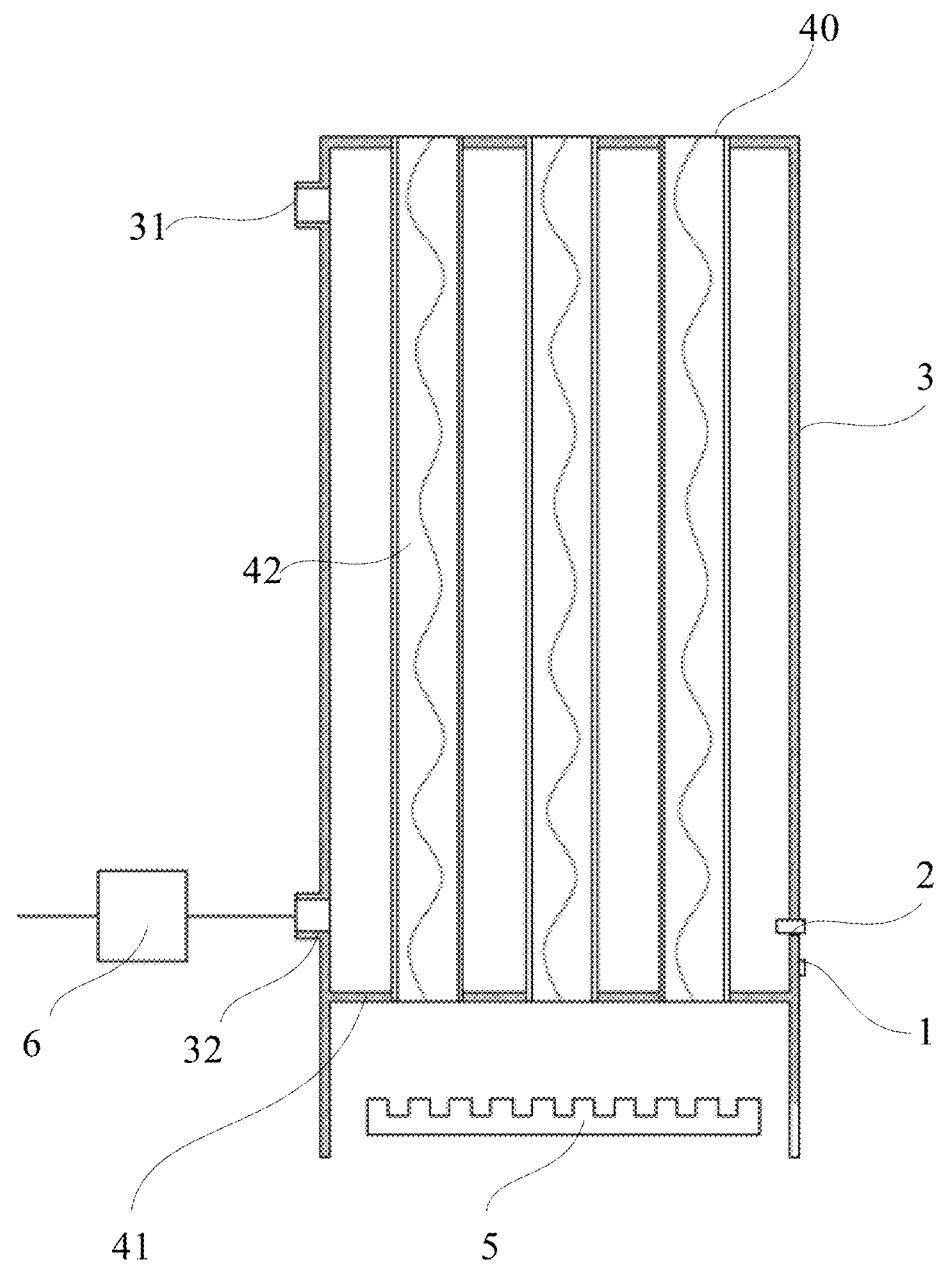
FIG. 8 is a schematic structural diagram of a water heater provided in an embodiment of the present disclosure.

Referring to FIGS. 1 and 8, an embodiment of the present disclosure provides a scale detection method, which may comprise the following steps:

S10: acquiring a first temperature of a heat exchange zone of a water heating device;

S12: acquiring a second temperature indicating a water temperature in the water heating device, and acquiring a temperature difference between the first temperature and the second temperature;

S14: determining that a scale generation amount in the water heating device reaches a preset threshold when at least one of the following judgment conditions is met: the first temperature is not less than a preset temperature threshold; and the temperature difference is not less than a preset temperature difference threshold.

In this embodiment, the scale detection method is applied to the water heating device to ensure that a user can be reliably and timely reminded to clean the scale under different working conditions. In this specification, a water heater is mainly taken as an example to illustrate the water heating device, and other types of water heating devices can be referred by analogy, which will not be described in detail here.

The heat exchange zone of the water heating device may be an area in a heat exchange mechanism for heating water in the water heating device. The water heating device is provided with a first temperature detector 1 configured to acquire a temperature of the position. The first temperature detector 1 may be utilized to acquire a first temperature of the heat exchange zone of the water heating device.

In which, the heat exchange zone (an inner wall where water flows through and/or is stored) of the water heating device will produce a temperature change before and after scaling. Before scaling, the temperature of the heat exchange zone will not be too high because of a heat exchange with the water. After scaling, the scale hinders the heat transfer from the heat exchange zone to the water, and the heat in the heat exchange zone cannot be transferred to the water in time, so a temperature on a wall surface will continue rising.

In one embodiment, the heat exchange zone may comprise a high-temperature heat exchange zone 41 and a low-temperature heat exchange zone 42 opposite to each other, and a temperature of the high-temperature heat exchange zone 41 is acquired as the first temperature. That is, the first temperature is a temperature of the high-temperature heat exchange zone 41. The high-temperature heat exchange zone 41 and the low-temperature heat exchange zone 42 may be formed during a heat exchange between a water storage mechanism of the water heating device and the heat exchange mechanism. For example, when the water storage mechanism is a water tank 3, the high-temperature heat exchange zone 41 is an area where the heat exchange mechanism first exchanges heat with the water tank 3.

In step S10, the first temperature of the heat exchange zone may be acquired using the first temperature detector 1, and the first temperature is different before and after scaling in the heat exchange zone. The first temperature acquired after scaling is higher than that before scaling.

In the step S12, the second temperature indicating the water temperature in the water heating device may be acquired using the second temperature detector 2. In which, the water heating device may be a water heating device provided with a water tank 3, such as a volumetric water heater, or a water heating device provided with a heat exchange pipe, such as an instant water heater, or any other form of water heating device. In this specification, the water heating device provided with the water tank 3 is mainly taken as an example for illustration, and other types of water heaters can be referred by analogy. When the water heating device comprises the water tank 3, the second temperature is a water temperature in the water tank 3 of the water heating device. Specifically, the second temperature may be a water temperature at a certain position of the water tank 3 or an average value of water temperatures in the water tank 3. When the second temperature is a water temperature at a certain position of the water tank 3, the value of the second temperature may be slightly varied depending on the position of the detected temperature point of the water tank 3.

Based on the first temperature acquired in step S10 and the second temperature acquired in step S12, a temperature difference between the first temperature and the second temperature may be acquired. Before scaling, the temperature difference between the first temperature and the second temperature will not be too large, and will be less than a preset temperature difference threshold. After scaling, the temperature difference between the first temperature and the second temperature will reach or exceed the preset temperature difference threshold mainly because the first temperature rises.

Based on the first temperature acquired in step S10 and the temperature difference between the first temperature and the second temperature acquired in step S12, step S14 is executed: determining that a scale generation amount in the water heating device reaches a preset threshold when at least one of the following judgment conditions is met: the first temperature is not less than a preset temperature threshold; and the temperature difference is not less than a preset temperature difference threshold.

In this embodiment, in the whole operation process of the water heating device, two judgment conditions may be run in a preset cycle or in real time. Specifically, the scale detection method executes the judgment conditions that the first temperature is not less than the preset temperature threshold and the temperature difference is not less than the preset temperature difference threshold at a same time node synchronously or at different time nodes alternately. That is, the two judgment conditions may be executed synchronously with a same starting point and a same cycle; the two judgment conditions may also be executed alternately with different starting points and a same cycle; and of course, the two judgment conditions may be executed asynchronously with a same starting point and different cycles, or different starting points and different cycles.

Because the current scale detection accuracy is insufficient, and especially, the user is not reminded in time when the scale has been thick enough and needs to be cleaned, the inventor makes an in-depth study on the first temperatures before and after scaling and the temperature difference between the first temperature and the second temperature. The detailed analyses and explanations are given below in conjunction with the experimental data.

Please refer to FIGS. 2 to 7, which illustrate the temperature curves corresponding to the first temperature T1, the second temperature T2 and the temperature difference ΔT between the first temperature T1 and the second temperature T2 before and after scaling in the water heating device under the working conditions of different flow rates.

Figure 2:
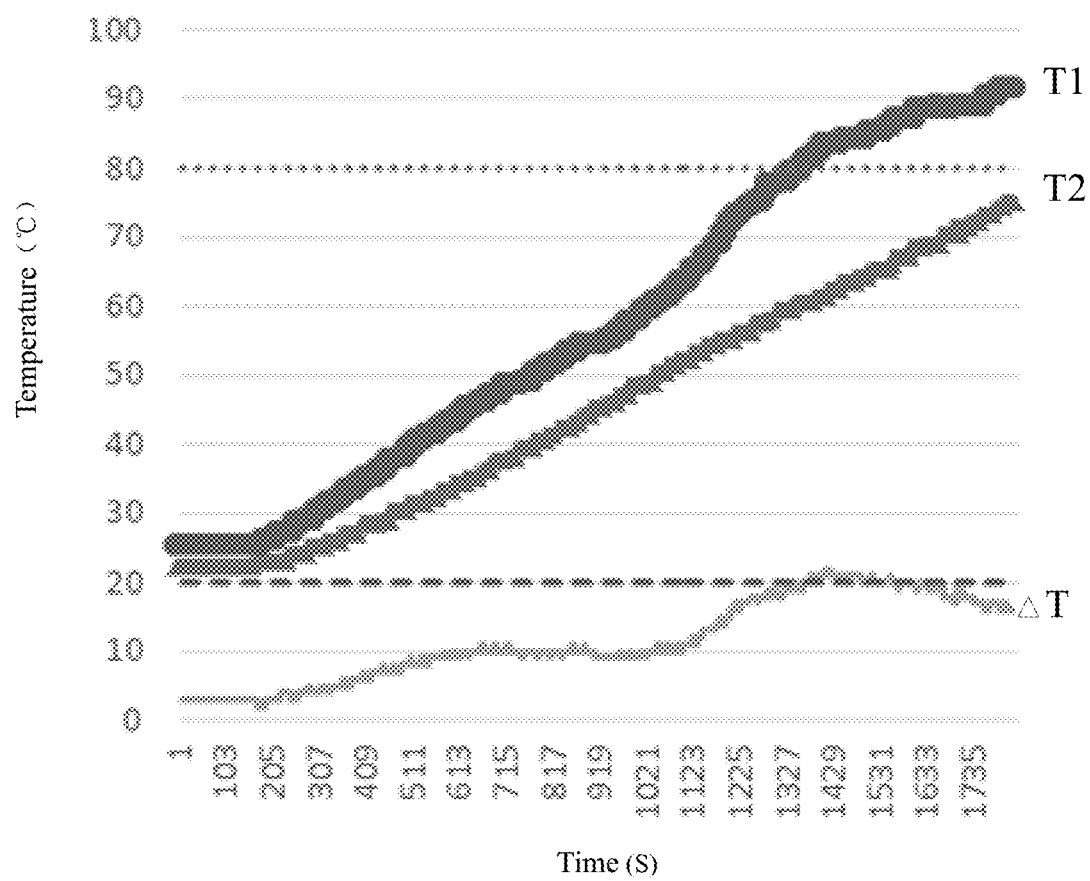
FIG. 2 is a temperature graph of a water heating device under static working conditions after scale is generated.
Figure 5:
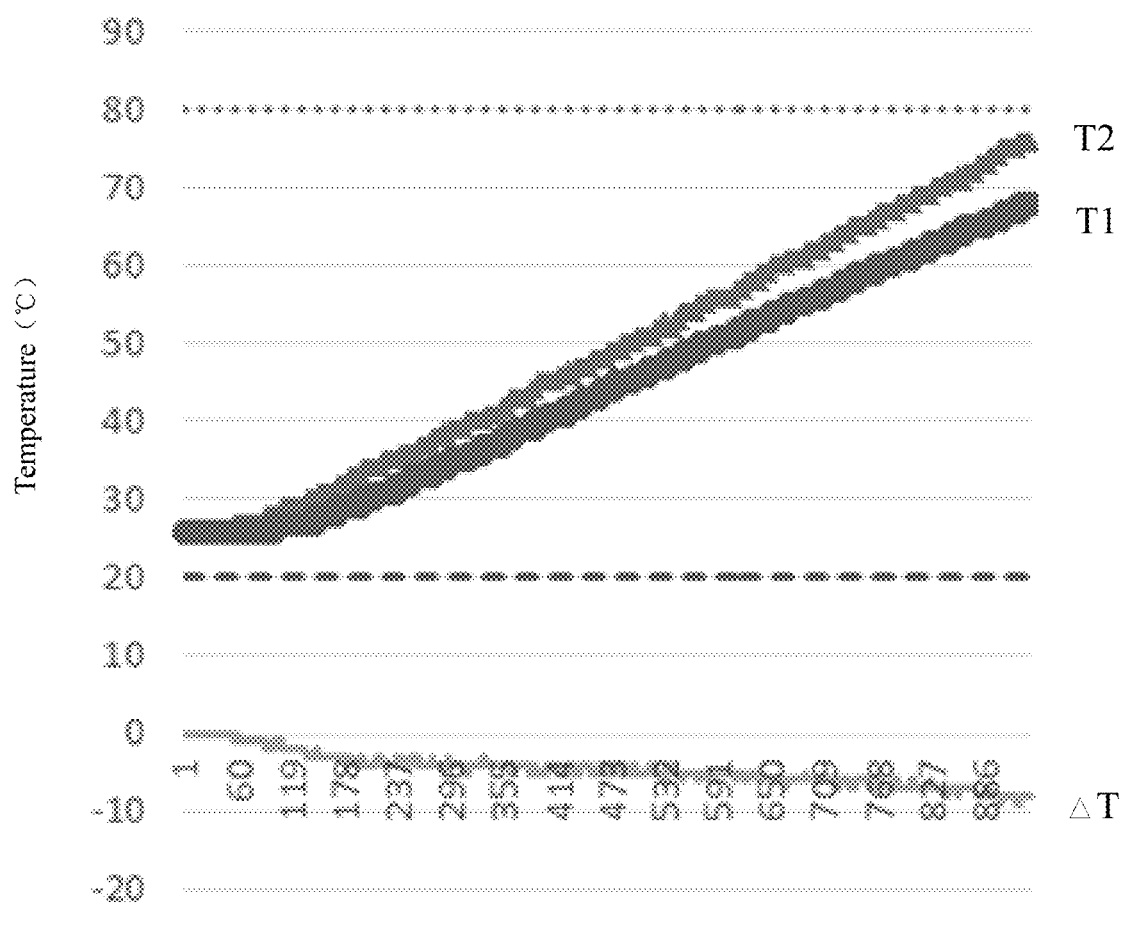
FIG. 5 is a temperature graph of a water heating device under static working conditions before scale is generated.

Please refer to FIGS. 2 and 5, under a first working condition, when a flow rate in the water heating device is less than a first preset flow rate, the judgment condition that the first temperature T1 is not less than the preset temperature threshold is preferentially triggered.

In this embodiment, when the flow rate in the water heating device is less than the first preset flow rate, there may be two working conditions, i.e., a static working condition where a user does not use water, and a minimum-flow-rate working condition close to the static working condition. That is, when the flow rate is less than the first preset flow rate, the corresponding working conditions include a working condition where the user does not use water, and a working condition where the user uses a very small amount of water. Under those working conditions, the judgment condition that the first temperature T1 is not less than the preset temperature threshold is preferentially triggered.

In which, the preset temperature threshold is between 60° C. and 110° C. The preset temperature threshold may be comprehensively selected in conjunction with a highest water outlet temperature that can be set by the water heating device and a water outlet temperature set by the user. Specifically, the preset temperature threshold may be within a maximum water outlet temperature range that can be set by the water heating device, and may be the water outlet temperature set by the user. Of course, the preset temperature threshold may also be slightly higher than a set outlet water temperature. For example, in the drawings of this specification, the preset temperature threshold may be 80° C.

As illustrated in FIG. 2, after the scale is generated in the water heating device, the first temperature T1 will continue rising during operation and exceed the preset temperature threshold at a certain time point.

As illustrated in FIG. 5, when there is no scale in the water heating device, the first temperature T1 will continue rising during operation, but will not exceed the preset temperature threshold.

As can be seen from the above comparative analysis, when the flow rate in the water heating device is less than the first preset flow rate, and the working condition is or close to the static working condition, it can be accurately judged whether the scale in the water heating device is thick enough and needs to be cleaned, by detecting whether the first temperature T1 exceeds the preset temperature threshold.

Figure 3:
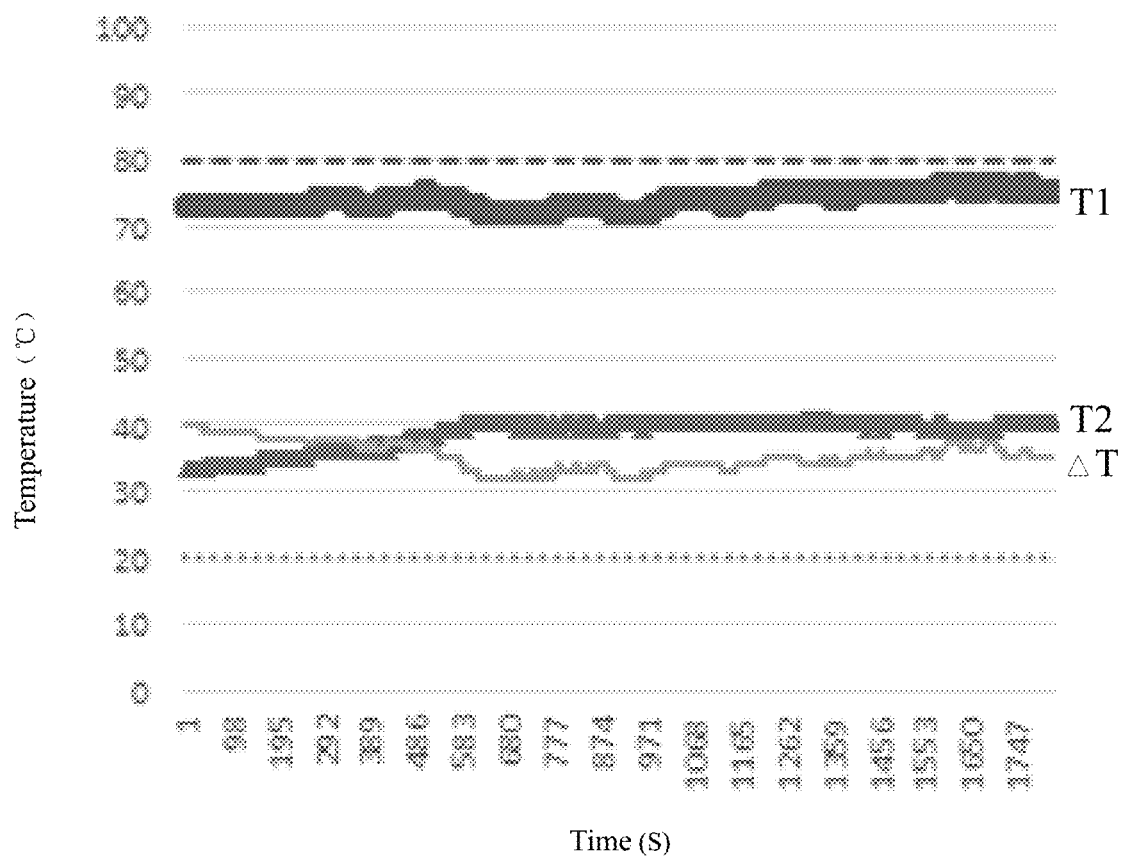
FIG. 3 is a temperature graph of a water heating device under a working condition of large flow rate after scale is generated.
Figure 6:
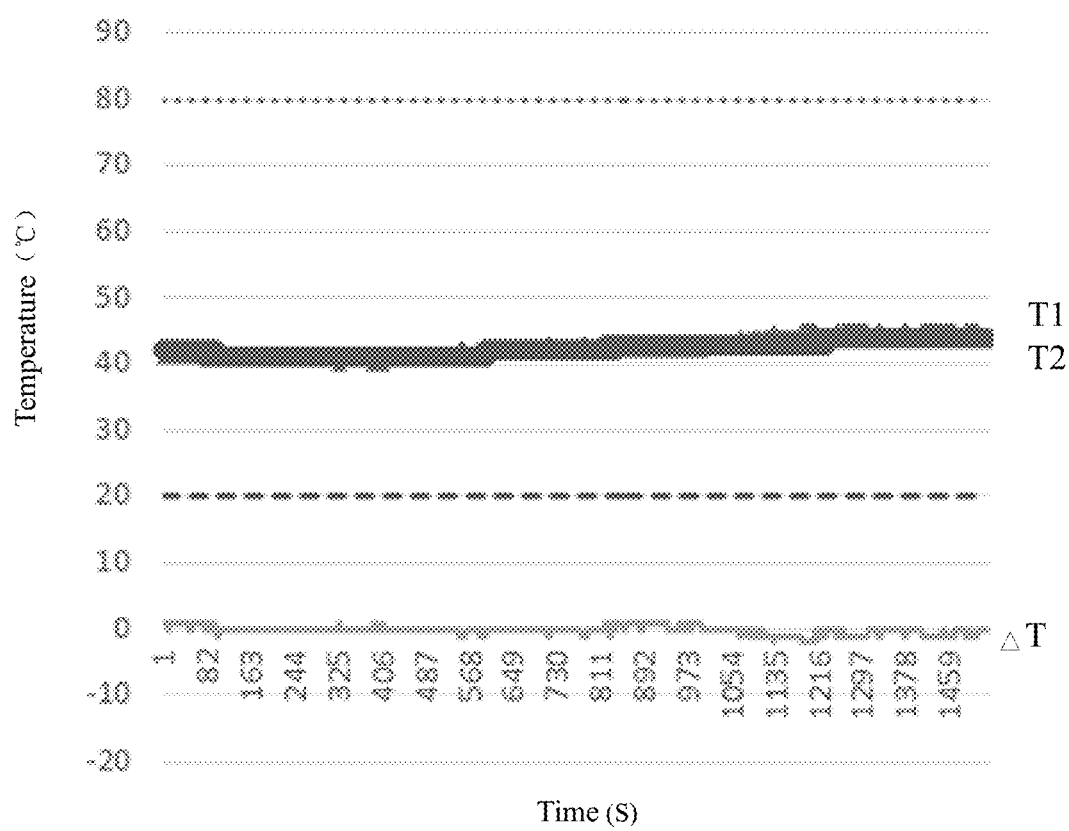
FIG. 6 is a temperature graph of a water heating device under a working condition of large flow before scale is generated.

Please refer to FIGS. 3 and 6, under a second working condition, when the flow rate in the water heating device is greater than the second preset flow rate, the judgment condition that the first temperature T1 is not less than the preset temperature threshold is preferentially triggered.

In this embodiment, when the flow rate in the water heating device is greater than the second preset flow rate, i.e., it is a large-flow-rate working condition, the judgment condition that the first temperature T1 is not less than the preset temperature threshold is preferentially triggered. The large-flow-rate working condition is that the water heating device is in a continuous heating state, and the outlet water temperature thereof has not yet reached the outlet water temperature set by the user.

In which, the preset temperature threshold is between 60° C. and 110° C. For the specific setting of the preset temperature threshold, please refer to the specific description of the first working condition, and it will not be described in detail here. In which, the preset temperature threshold may be 80° C. The temperature curve of the first temperature illustrated in FIG. 3 gradually rises with the increase of the working time, and the first temperature T1 will exceed 80° C. after a certain duration of operation, especially with the increase of the scale thickness. Of course, under the second working condition, the specific value of the preset temperature threshold may be different from that under the first working condition, for example, it may be set to 75° C., so that the user can be reminded to clean the scale as soon as possible after the scale accumulates for a certain amount.

As illustrated in FIG. 6, when there is no scale in the water heating device or the amount of the scale is very small, the first temperature T1 will not be too high since being influenced by the water temperature in the water heating device under the large-flow-rate working condition, and it is less than 50° C. in FIG. 6.

Figure 4:
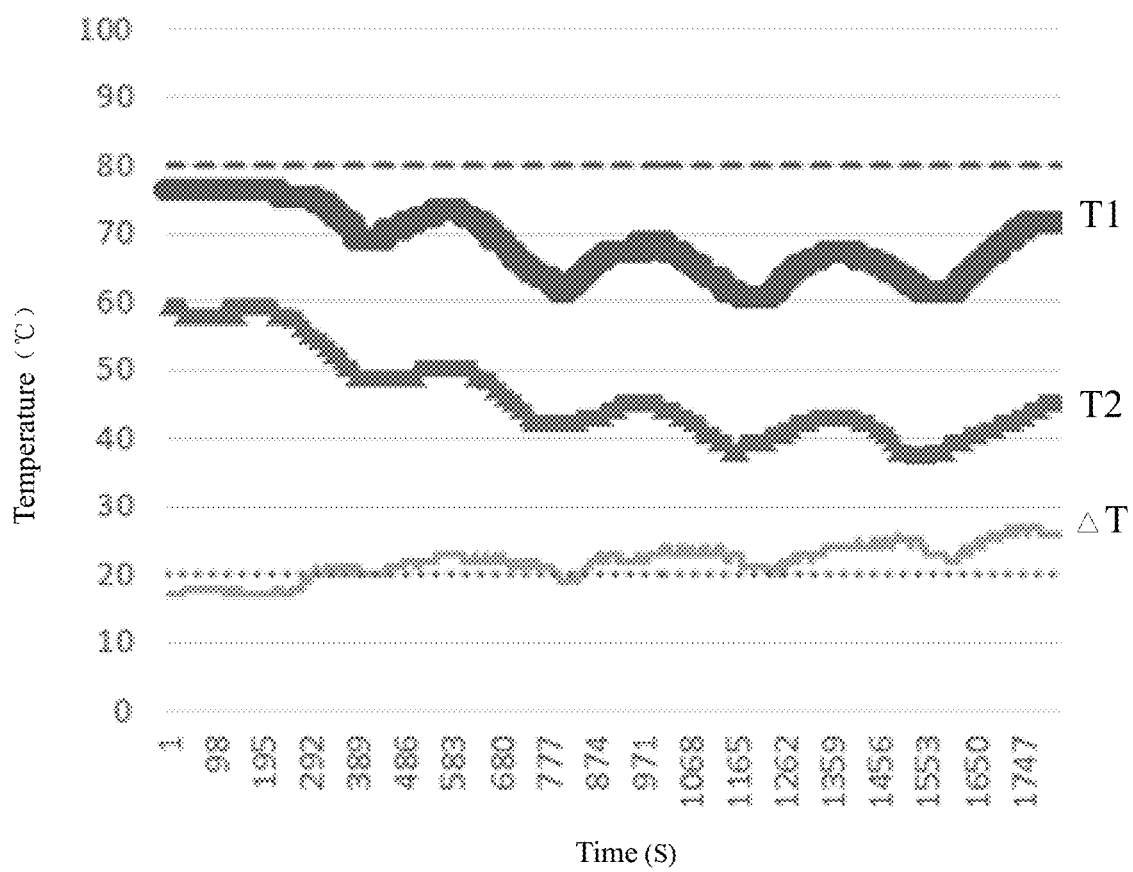
FIG. 4 is a temperature graph of a water heating device under a working condition of small flow rate after scale is generated.
Figure 7:
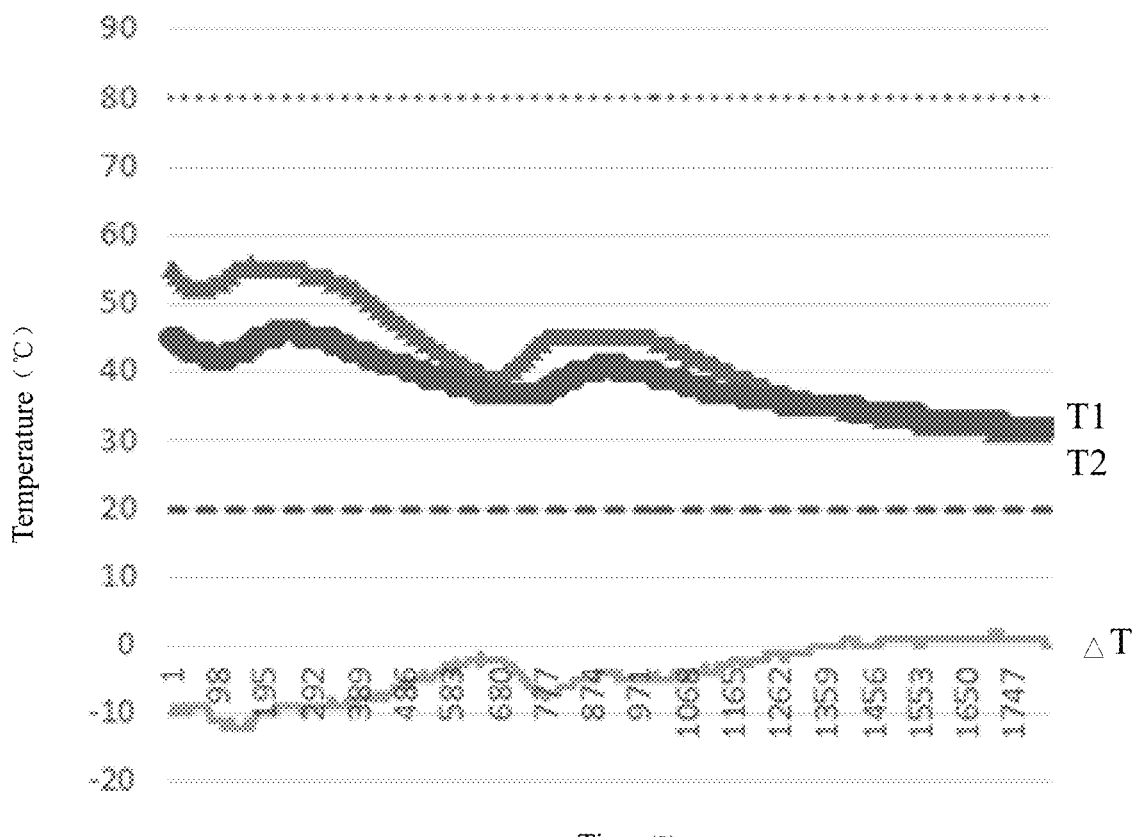
FIG. 7 is a temperature graph of a water heating device under a working condition of small flow before scale is generated.

Please refer to FIGS. 4 and 7, under a third working condition, when the flow rate in the water heating device is greater than the first preset flow rate and less than the second preset flow rate, the judgment condition that the temperature difference ΔT is not less than the preset temperature difference threshold is preferentially triggered.

In this embodiment, when the water heating device is between the above two working conditions, i.e., under the small-flow-rate working condition, the judgment condition that the temperature difference ΔT is not less than the preset temperature difference threshold is preferentially triggered. In which, the small-flow-rate working condition is specifically that the water heating device is in an intermittent heating state, and the outlet water temperature has reached the outlet water temperature set by the user. In which, the preset temperature difference threshold may be between 8° C. and 30° C. Specifically, the preset temperature difference threshold may be slightly varied depending on the specific positions of the two temperature detectors, the inlet water temperature, etc. In which, 30° C. is a limit value of the temperature difference ΔT between the first temperature T1 and the second temperature T2.

In FIGS. 4 and 7, the preset temperature difference threshold is 20° C. When the temperature difference ΔT between the first temperature T1 and the second temperature T2 reaches or exceeds 20° C., it means that the scale has been thick enough and needs to be cleaned, and a reminding signal may be sent to the user at this time.

As illustrated in FIG. 4, when scale is generated in the water heating device, the temperature difference ΔT between the first temperature T1 and the second temperature T2 will reach and exceed the preset temperature difference threshold during operation.

As illustrated in FIG. 7, when there is no scale in the water heating device, or the amount of the scale is small and not thick enough to be cleaned, the temperature difference ΔT between the first temperature T1 and the second temperature T2 is always less than the preset temperature difference threshold during operation.

In one embodiment, the scale detection method may further comprise: acquiring a flow rate in the water heating device; the judgment condition is that the first temperature T1 is not less than the preset temperature threshold, when the flow rate in the water heating device is less than a first preset flow rate or greater than a second preset flow rate; and the judgment condition is that the temperature difference ΔT is not less than the preset temperature difference threshold, when the flow rate in the water heating device is greater than the first preset flow rate and less than the second preset flow rate.

In this embodiment, the above two judgment conditions may be pre-stored in the controller. In a detection, flow rate data may be acquired first, and then an adaptive judgment condition is called according to the flow rate data. Specifically, for each judgment condition and a result corresponding thereto, please refer to the specific descriptions of the above embodiments, and they will not be described in detail here.

To sum up, the scale detection method provided in this specification flexibly adapts the judgment conditions for different working conditions, and it is employed to accurately judge whether a scale generation amount in the water heating device has reached a preset threshold. That is, the scale detection method provided in this specification can automatically adapt different judgment conditions for different working conditions, thus ensuring that that the user can be reliably and timely reminded to clean the scale under different working conditions.

A scale detection system is provided in the specification of the present disclosure, which may comprise: a first temperature detector 1 configured to acquire a first temperature T1 of a heat exchange zone of a water heating device; a second temperature detector 2 configured to acquire a second temperature T2 indicating a water temperature in the water heating device; and a controller in communication with the first temperature detector 1 and the second temperature detector 2, and configured to acquire a temperature difference ΔT between the first temperature T1 and the second temperature T2 based on the first temperature T1 acquired by the first temperature detector 1 and the second temperature T2 acquired by the second temperature detector 2, and determine that a scale generation amount in the water heating device reaches a preset threshold when at least one of the following judgment conditions is met: the first temperature T1 is not less than a preset temperature threshold; and the temperature difference ΔT is not less than a preset temperature difference threshold.

In this embodiment, the scale detection system is provided with a first temperature detector 1 configured to acquire a first temperature T1 of the heat exchange zone of the water heating device, a second temperature detector 2 configured to acquire a second temperature T2 indicating a water temperature in the water heating device, and a controller in communication with the first temperature detector 1 and the second temperature detector 2. In which, the controller is configured to execute the steps of the scale detection method. Specifically, for the technical effects that can be achieved by the scale detection system, please refer to the specific description of the scale detection method, which will not be described in detail here.

Please refer to FIGS. 8 to 11, the specification of the present disclosure further provides a water heater provided with the scale detection system. In addition, the water heater further comprises: a heat exchange mechanism provided with at least one heat exchange runner 40 allowing heat exchange fluid to flow through; and a water tank 3, wherein the heat exchange fluid can exchange heat with water in the water tank 3 when flowing through the heat exchange runner, so that the heat exchange mechanism forms a high-temperature heat exchange zone 41 and a low-temperature heat exchange zone 42 opposite to each other, and the heat exchange fluid flows through the high-temperature heat exchange zone 41 and the low-temperature heat exchange zone 42 in turn.

In this embodiment, the specific form of the water heater is not limited. In this specification, a gas water heater is taken as an example for illustration. When the water heater is a gas water heater, it may comprise a burner 5. High-temperature flue gas generated in burning by the burner 5 flows through the heat exchange mechanism and exchanges heat with the water in the water tank 3. In which, the heat exchange mechanism may be varied depending on different forms of the water heater, which is not specifically limited here. For example, when the water heater is a gas water heater, the heat exchange mechanism may be in the form of a heat exchange flue pipe, and the heat exchange fluid is high-temperature flue gas generated in the burning by the burner 5. When the heat exchange runner 40 is a heat exchange flue pipe, it may penetrate the water tank 3, and an outer side of a pipe wall of the heat exchange flue pipe is fixed with a top wall 33 and a bottom wall 34 or fixed with a sidewall 35.

In this embodiment, when the heat exchange fluid is high-temperature flue gas, it can exchange heat with water in the water tank 3 when flowing through the heat exchange flue pipe, so that the heat exchange mechanism forms a high-temperature heat exchange zone 41 and a low-temperature heat exchange zone 42 opposite to each other, and the high-temperature flue gas flows through the high-temperature heat exchange zone 41 and the low-temperature heat exchange zone 42 in turn.

As illustrated in FIG. 8, the water tank 3 has a top wall 33 and a bottom wall 34 opposite to each other and sidewalls 35 enclosed between the top wall 33 and the bottom wall 34, the heat exchange runner 40 is disposed in the water tank 3 to penetrate therethrough, and the high-temperature heat exchange zone 41 is an area where the heat exchange runner 40 first contacts the water tank 3.

In this embodiment, the high-temperature heat exchange zone 41 may be an area where the heat exchange mechanism first contacts the water tank 3, and this area contacts or overlaps a certain wall surface of the water tank 3. Specifically, a position of the high-temperature heat exchange zone 41 is varied depending on an assembly relationship between the heat exchange mechanism and the water tank 3.

Figure 9:
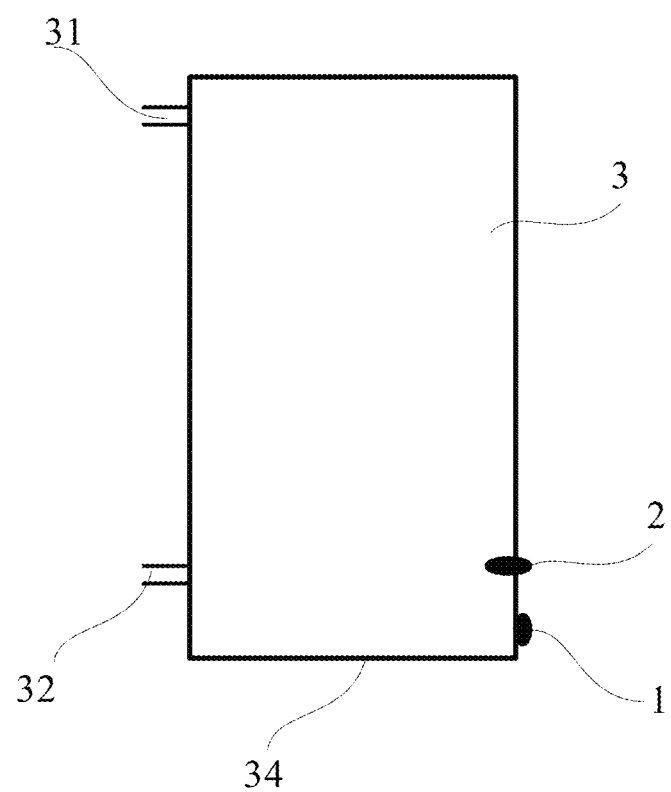
FIG. 9 is a schematic distribution diagram of a first temperature detector and a second temperature detector of a first water heater provided in an embodiment of the present disclosure.

As illustrated in FIG. 9, the high-temperature heat exchange zone 41 is an area where the heat exchange runner 40 contacts the bottom wall 34 of the water tank 3, when the heat exchange runner 40 penetrates the water tank 3 from the bottom wall 34 to the top wall 33 and the heat exchange fluid flows from the bottom wall 34 to the top wall 33.

Figure 10:
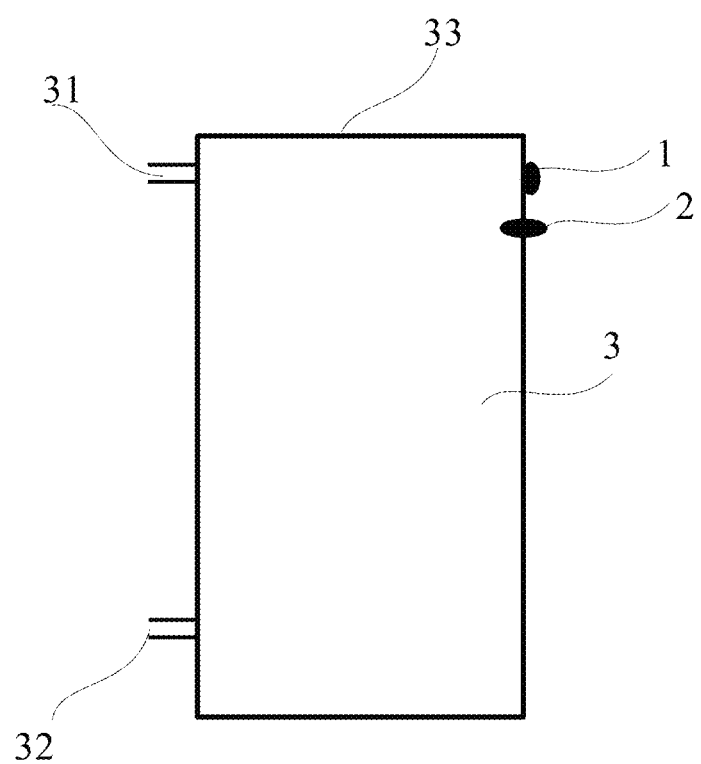
FIG. 10 is a schematic distribution diagram of a first temperature detector and a second temperature detector of a second water heater provided in an embodiment of the present disclosure.

As illustrated in FIG. 10, the high-temperature heat exchange zone 41 is an area where the heat exchange runner 40 contacts the top wall 33 of the water tank 3, when the heat exchange fluid flows from the top wall 33 to the bottom wall 34.

Figure 11:
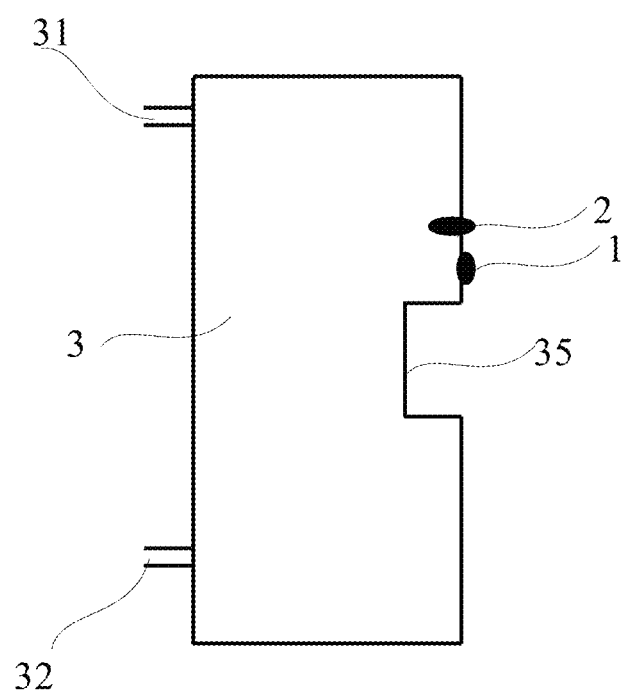
FIG. 11 is a schematic distribution diagram of a first temperature detector and a second temperature detector of a third water heater provided in an embodiment of the present disclosure.

As illustrated in FIG. 11, the high-temperature heat exchange zone 41 is an area where the heat exchange runner 40 contacts the sidewall 35 of the water tank 3, when the heat exchange runner 40 first contacts the sidewall 35 of the water tank 3.

In this embodiment, the first temperature detector 1 is disposed on a wall of the water tank 3 corresponding to the high-temperature heat exchange zone 41, and the second temperature detector 2 is disposed on a wall of the water tank 3 corresponding to the low-temperature heat exchange zone 42.

Specifically, the first temperature detector 1 is disposed on a wall of the water tank 3 within a first height range from the high-temperature heat exchange zone 41. The first height range is from 5 cm to 60 cm. Specifically, the first height range may be determined according to an allowable scaling amount of the water heater. The first height may be greater than an allowable scaling thickness of the water heater.

The second temperature detector 2 is disposed downstream of the first temperature detector 1 in a flow direction of the heat exchange fluid, and a predetermined height interval is formed between the second temperature detector 2 and the first temperature detector 1 in a height direction of the water tank 3, thus ensuring that the second temperature detector 2 for acquiring the water temperature will not be affected by the scale.

In one embodiment, the water tank 3 is provided with a water inlet 32 and a water outlet 31, and the second temperature detector 2 is disposed at a preset interval from the water inlet 32 of the water tank 3.

In this embodiment, in order to increase the temperature difference ΔT between the first temperature T1 acquired by the first temperature detector 1 and the second temperature T2 acquired by the second temperature detector 2, the second temperature detector 2 may be disposed close to the water inlet 32 of the water tank 3. Specifically, the second temperature detector 2 may be disposed at the water inlet 32.

When the second temperature detector 2 is disposed close to the water inlet 32, the water temperature detected by the second temperature detector 2 is a minimum temperature in the water tank 3, thus ensuring that the temperature difference ΔT can be formed between the first temperature T1 and the second temperature T2 efficiently and reliably. Subsequently, the corresponding judgment condition is triggered according to the current flow rate. Under the small-flow-rate working condition, it can be accurately judged whether there is scale in the water tank 3 using the temperature difference ΔT of rapid response, so as to further improve the accuracy and reliability of the process.

It should be noted that in order to acquire the flow rate data, the water heater may be provided with a flow rate detector 6, which may be disposed at the water inlet 32 of the water heater or in a pipeline in communication with the water inlet 32. Alternatively, the flow rate detector 6 may be disposed at the water outlet 31 of the water heater or in a pipeline in communication with the water outlet 31. In addition, the water heater may not be provided with the flow rate detector 6, and a flow rate signal may be acquired using the flow rate detector in the pipeline in communication with the water heater.

In addition, the water heater may also have an alarm, which can send a reminding signal to the user through one or more combinations of sound, light and digital display, when the controller judges that the scale is thick enough and needs to be cleaned.

It should be noted that in the description of the present disclosure, the terms 'first', 'second', etc. are only used for descriptive purposes and to distinguish similar objects, and there is no order between them, nor can they be understood as indicating or implying relative importance. In addition, in the description of the present disclosure, unless otherwise specified, 'plurality of' means two or more.

The above embodiments in this specification are all described in a progressive manner, and the same or similar portions of the embodiments can refer to each other. Each embodiment lays an emphasis on its distinctions from other embodiments.

Those described above are just a few embodiments of the present disclosure. Although the embodiments disclosed by the present disclosure are given as above, the content thereof is only for the convenience of understanding the present disclosure, rather than limiting the present disclosure. Persons skilled in the technical field of the present disclosure can make any modification and change in the forms and details of the embodiments without departing from the spirit and scope disclosed by the present disclosure. However, the patent protection scope of the present disclosure should still be subject to the scope defined by the appended claims.

What is claimed is:

1. A scale detection method, comprising:
    acquiring a first temperature of a heat exchange zone of a water heating device;
    acquiring a second temperature indicating a water temperature in the water heating device, and
    acquiring a temperature difference between the first temperature and the second temperature; and
    determining that a scale generation amount in the water heating device reaches a preset threshold when at least one of the following judgment conditions is met:
        the first temperature is not less than a preset temperature threshold; and
        the temperature difference is not less than a preset temperature difference threshold,
    wherein the method further comprises:
        acquiring a flow rate in the water heating device;
        triggering the judgement condition that the first temperature is not less than the preset temperature threshold, when the flow rate in the water heating device is less than a first preset flow rate or greater than a second preset flow rate; and
        triggering the judgement condition that the temperature difference is not less than the preset temperature difference threshold, when the flow rate in the water heating device is greater than the first preset flow rate and less than the second preset flow rate.

2. The scale detection method according to claim 1, wherein the judgment conditions that the first temperature is not less than the preset temperature threshold and the temperature difference is not less than the preset temperature difference threshold is executed at a same time node synchronously or at different time nodes alternately.

3. The scale detection method according to claim 1, wherein the heat exchange zone comprises a high-temperature heat exchange zone and a low-temperature heat exchange zone opposite to each other, and a temperature of the high-temperature heat exchange zone is acquired as the first temperature.

4. The scale detection method according to claim 1, wherein the water heating device comprises a water tank, and the second temperature is a water temperature in the water tank of the water heating device.

5. The scale detection method according to claim 1, wherein the preset temperature threshold is between 60° C. and 110° C.

6. The scale detection method according to claim 1, wherein the preset temperature difference threshold is between 8° C. and 30° C.

7. A scale detection system, comprising:
a first temperature detector configured to acquire a first temperature of a heat exchange zone of a water heating device;
a second temperature detector configured to acquire a second temperature indicating a water temperature in the water heating device; and
a controller in communication with the first temperature detector and the second temperature detector, and configured to acquire a temperature difference between the first temperature and the second temperature based on the first temperature acquired by the first temperature detector and the second temperature acquired by the second temperature detector, and determine that a scale generation amount in the water heating device reaches a preset threshold when at least one of the following judgment conditions is met:
the first temperature is not less than a preset temperature threshold; and
the temperature difference is not less than a preset temperature difference threshold, and
wherein the controller is further configured to:
acquire a flow rate in the water heating device;
trigger the judgement condition that the first temperature is not less than the preset temperature threshold, when the flow rate in the water heating device is less than a first preset flow rate or greater than a second preset flow rate; and
trigger the judgement condition that the temperature difference is not less than the preset temperature difference threshold, when the flow rate in the water heating device is greater than the first preset flow rate and less than the second preset flow rate.

8. A water heater, comprising the scale detection system according to claim 7.

9. The water heater according to claim 8, further comprising:
a heat exchange mechanism provided with at least one heat exchange runner allowing heat exchange fluid to flow through; and
a water tank, wherein the heat exchange fluid can exchange heat with water in the water tank when flowing through the heat exchange runner, so that the heat exchange mechanism forms a high-temperature heat exchange zone and a low-temperature heat exchange zone opposite to each other, and the heat exchange fluid flows through the high-temperature heat exchange zone and the low-temperature heat exchange zone in turn.

10. The water heater according to claim 9, wherein the first temperature detector is disposed on a water tank wall of a water tank area corresponding to the high-temperature heat exchange zone.

11. The water heater according to claim 9, wherein the first temperature detector is disposed on a water tank wall within a first height range from the heat exchange mechanism, and a predetermined height interval is formed between the second temperature detector and the first temperature detector in a height direction of the water tank.

12. The water heater according to claim 11, wherein the second temperature detector is disposed downstream of the first temperature detector in a flow direction of the heat exchange fluid.

13. The water heater according to claim 12, wherein the first height range is from 5 cm to 60 cm.

14. The water heater according to claim 9, wherein the water tank is provided with a water inlet and a water outlet, and the second temperature detector is disposed at a preset interval from the water inlet of the water tank.

15. The water heater according to claim 14, wherein the second temperature detector is disposed at the water inlet.

16. The water heater according to claim 9, wherein the water tank has a top wall and a bottom wall opposite to each other and sidewalls enclosed between the top wall and the bottom wall, the heat exchange runner is disposed in the water tank to penetrate therethrough, and the high-temperature heat exchange zone is an area where the heat exchange runner first contacts the water tank.

17. The water heater according to claim 16, wherein,
the high-temperature heat exchange zone is an area where the heat exchange runner contacts the bottom wall of the water tank, when the heat exchange runner penetrates the water tank from the bottom wall to the top wall and the heat exchange fluid flows from the bottom wall to the top wall; or,
the high-temperature heat exchange zone is an area where the heat exchange runner contacts the top wall of the water tank, when the heat exchange fluid flows from the top wall to the bottom wall; or,
the high-temperature heat exchange zone is an area where the heat exchange runner contacts the sidewall of the water tank, when the heat exchange runner first contacts the sidewall of the water tank.

18. The water heater according to claim 17, wherein the heat exchange runner is a heat exchange flue pipe which penetrates the water tank, and an outer side of a pipe wall of the heat exchange flue pipe is fixed with the top wall and the bottom wall or fixed with the sidewall.

\* \* \* \* \*